United States Patent
Mukaiyama (10) Patent No.: US 6,862,926 B2
(45) Date of Patent: Mar. 8, 2005

(54) ROTARY SENSOR CAPABLE OF HIGH-PRECISION DETECTION OF ROTATION ANGLE TRANSMITTED FROM OUTSIDE

(75) Inventor: Ryuji Mukaiyama, Miyagi-ken (JP)

(73) Assignee: Alps Electric Co., LTD, Tokyo (JP)

( * ) Notice: Subject to any disclaimer, the term of this patent is extended or adjusted under 35 U.S.C. 154(b) by 0 days.

(21) Appl. No.: 10/194,104

(22) Filed: Jul. 11, 2002

(65) Prior Publication Data
US 2003/0015028 A1 Jan. 23, 2003

(30) Foreign Application Priority Data

Jul. 19, 2001 (JP) ........................................ 2001-219366
Apr. 23, 2002 (JP) ........................................ 2002-120159

(51) Int. Cl.$^7$ ............................................. G01M 15/00
(52) U.S. Cl. ...................................................... 73/118.1
(58) Field of Search ........................... 73/116, 117.2, 73/117.3, 118.1, 119 R (56) References Cited

U.S. PATENT DOCUMENTS

| 4,616,504 A | * | 10/1986 | Overcash et al. | 73/118.1 |
| 5,315,865 A | * | 5/1994 | Hornfeck et al. | 73/118.1 |
| 5,365,168 A | * | 11/1994 | Reichl | 324/207.16 |
| 5,460,035 A | | 10/1995 | Pfaffenberger | |
| 5,571,960 A | * | 11/1996 | Tateishi et al. | 73/118.2 |
| 5,757,179 A | * | 5/1998 | McCurley et al. | 324/207.2 |
| 5,798,639 A | * | 8/1998 | McCurley et al. | 324/207.2 |
| 6,497,158 B1 | * | 12/2002 | Daly et al. | 73/866.5 |
| 2001/0037794 A1 | * | 11/2001 | Wayama et al. | 123/399 |
| 2003/0110847 A1 | * | 6/2003 | Kubo et al. | 73/118.1 |

FOREIGN PATENT DOCUMENTS

| DE | 19941805 A1 | 9/1998 |
| GB | GB2228630 A | 8/1990 |
| JP | 2000-74611 | 3/2000 |

* cited by examiner

Primary Examiner—Eric S. McCall
(74) Attorney, Agent, or Firm—Beyer Weaver & Thomas LLP (57) ABSTRACT

There is provided a compact rotary sensor which can be assembled easily by improving the shape and mounting of a spring member. There is provided a housing, a rotary body rotatably supported in the housing, a detection unit operated by rotating the rotary body, and a driving shaft inserted in a recess formed on the rotary body for rotating the rotary body. A spring member made of metal having at least a pair of arm sections and a connecting section for connecting the arm sections is disposed in the recess of the rotary body, and the driving shaft is elastically pressed and sandwiched by the pair of arm sections.

9 Claims, 9 Drawing Sheets

ROTARY SENSOR CAPABLE OF HIGH-PRECISION DETECTION OF ROTATION ANGLE TRANSMITTED FROM OUTSIDE

BACKGROUND OF THE INVENTION

1. Field of the Invention

The present invention relates to a rotary sensor capable of detecting a rotation angle transmitted from outside used as a throttle sensor of an automobile, for example.

2. Description of the Related Art

Figure 14:
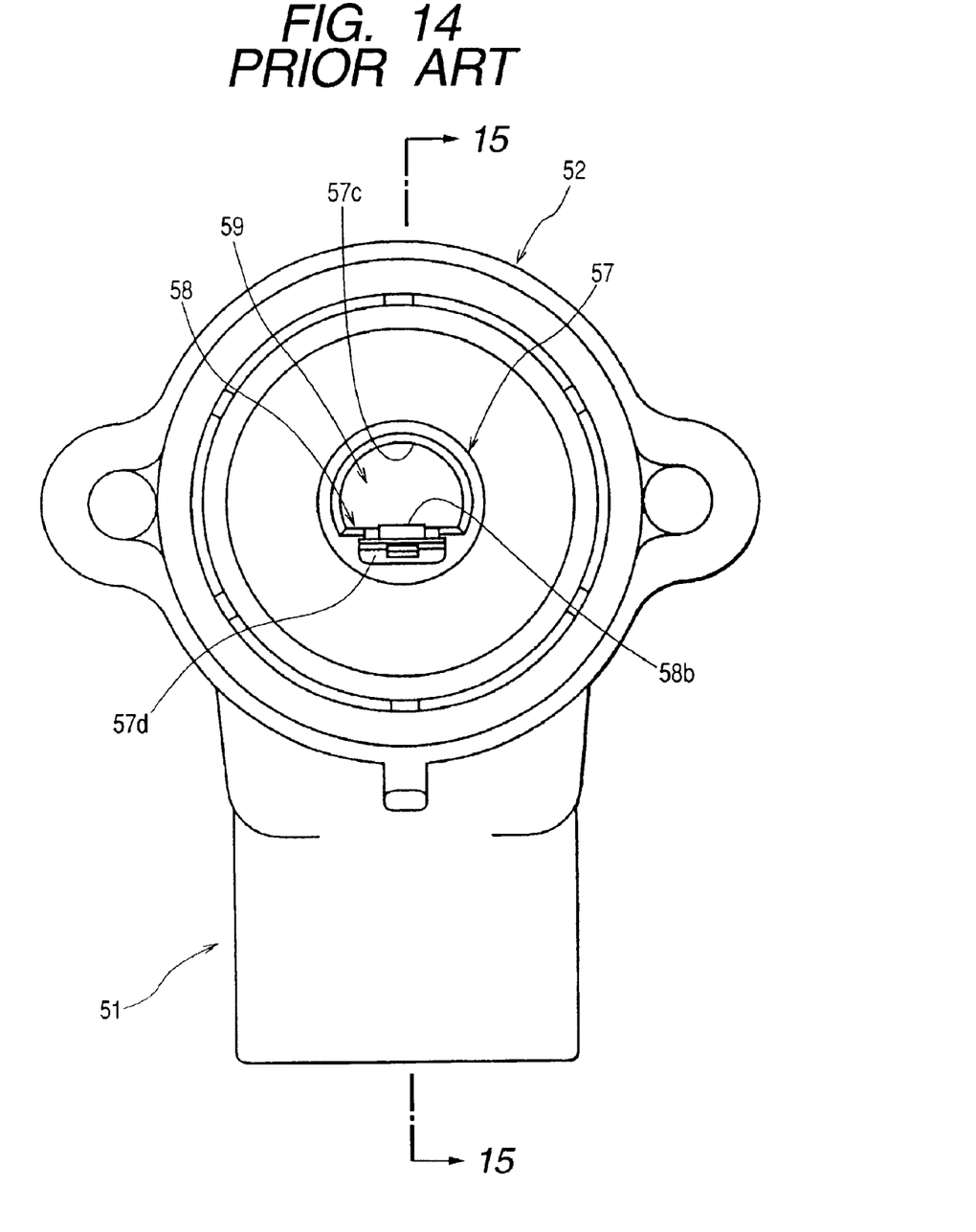
FIG. 14 is a front view of a rotary sensor according to the related art.
Figure 15:
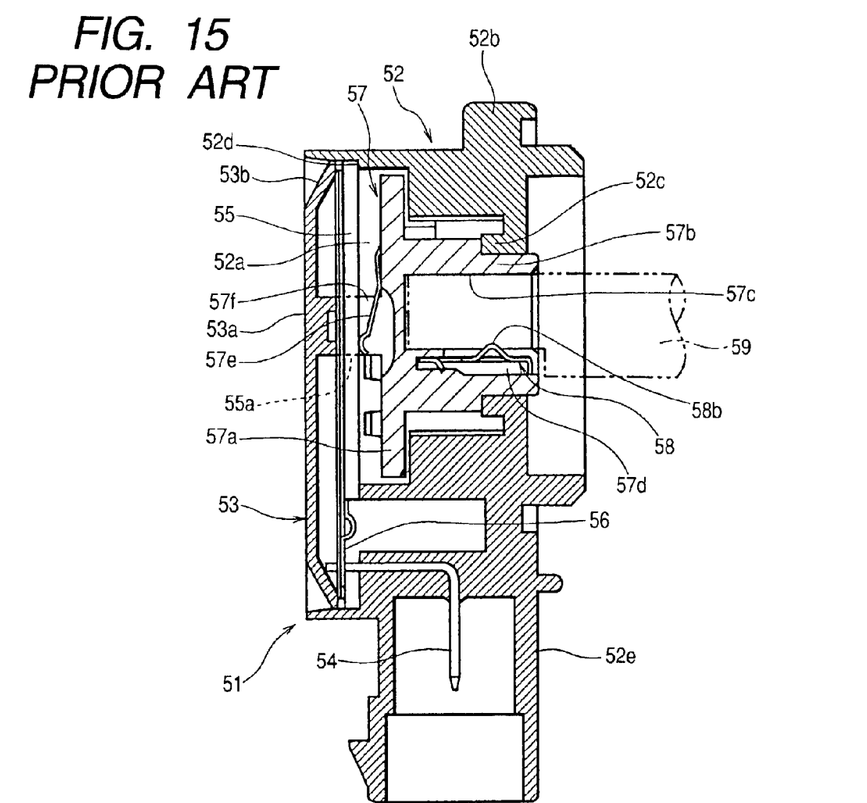
FIG. 15 is a sectional view taken along the line 15—15 in FIG. 14.
Figure 16:
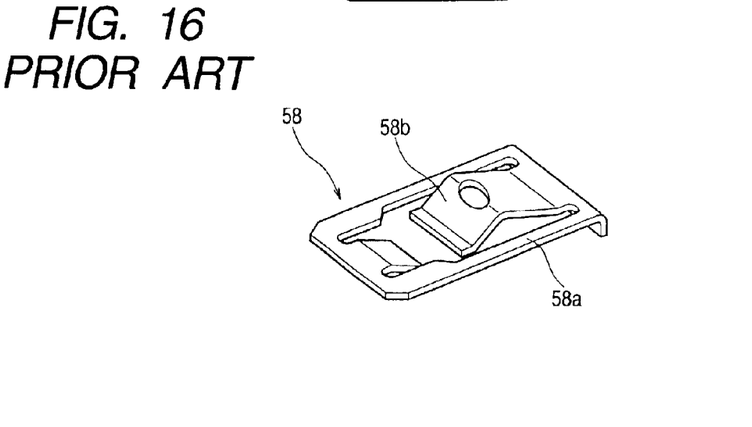
FIG. 16 is a perspective view of a spring member of the rotary sensor according to the related art.

Drawings of a rotary sensor according to the related art will now be described. FIG. 14 is a front view of a rotary sensor according to the related art. FIG. 15 is a sectional view taken along the line 15—15 in FIG. 14. FIG. 16 is a perspective view of a spring member of the rotary sensor according to the related art.

Referring to the rotary sensor according to the related art based on FIGS. 14 to 16, a housing 51 is constituted by a case 52 that is a part molded from synthetic resin and a lid 53 that closes an opening of the case 52 located on the rear side of the same.

The case 52 has a cylindrical side wall 52b having a container section 52a therein, a receiving section 52c that is a cylindrical section protruding into the container section 52a from the sidewall 52b, and a cylindrical section 52e formed such that it extends perpendicularly from the side wall 52b.

The lid 53 has a dish-like configuration and has a plate-like section 53a and a flange section 53b provided at the periphery of the plate-like section 53a.

The lid 53 is attached to the case 52 to close the opening by thermally caulking a rear part of the side wall 52b of the case 52.

A plurality of terminals 54 made of metal is used for a connector. The terminals 54 are embedded and mounted in the case 52 such that one end of each terminal protrudes into the container section 52a of the case 52 and such that the other end protrudes into the cylindrical section 52e.

A plate-like insulated substrate 55 has a hole 55a in the middle thereof, and a resistor pattern and a collector pattern made of a highly conductive material are provided on one surface of the insulated substrate 55 although not shown. The resistor pattern and the collector pattern are in conduction to the plurality of terminal sections 56 attached to the insulated substrate 55.

The insulated substrate 55 is contained in the container section 52a with a peripheral part of the same placed on a step section 52d, and the terminal sections 56 are solder-connected to the terminals 54 for a connector protruding into the container section 52a.

A rotary body 57 that is a part molded from synthetic resin has a disk-shaped section 57a, a cylindrical wall section 57b forwardly protruding from the center of the disk-shaped section 57a, a recess 57c provided in the middle of the cylindrical wall section 57b, a groove section 57d that is a substantially rectangular small recess formed contiguously to the recess 57c, and a protrusion 57f formed such that it protrudes from the disk-shaped section 57a rearward. The disk-shaped section 57a is also provided with a slider 57e formed from a conductive metal.

The rotary body 57 is contained in the container section 52a of the case 52. The cylindrical wall section 57b is in contact with the receiving section 52c, and the protrusion 57f is rotatably inserted in the hole 55a of the insulated substrate 55. When the rotary body 57 rotates, the slider 57e slides on the resistor and the collector to change the value of an output voltage.

The spring member 58 is formed by processing a metal plate, and it has a substantially plate-like base section 58a and an elastic piece 58b formed by bending an end of the base section 58a in the form of the character V. The spring member 58 has very small dimensions, and it is press-fitted and mounted in the groove section 57d of the rotary body 57.

A driving shaft 59 is in the form of a non-circular rod body and is press-fitted in the recess 57c of the rotary body 57 at a rear end thereof. A side of the driving shaft 59 is elastically pressed by the elastic piece 58b of the spring member 58 to be held by an elastic pressure. The driving shaft 59 can rotate the rotary body 57 within a predetermined range of rotation angles.

The driving shaft 59 is linked with a throttle valve of an automobile. When the driving shaft 59 rotates, the rotary body 57 rotates to cause the slider 57e to slide on the resistor and the collector consequently, which causes a change in the output voltage to enable detection of a rotation angle of the valve.

While the rotary sensor according to the related art is configured and operates as described above, it has a problem in that mass-productivity is low because the configuration for holding the driving shaft 59 with an elastic pressure using the spring member 58 press-fitted in the narrow groove section 57d requires an operation of press-fitting the small spring member 58 into the groove section 57d during assembly which reduces the ease of operation and assembly. The groove section 57d is provided on the rotary body 57 in addition to the recess 57c, which requires complicated processing and increases the size of the rotary body 57, resulting in another problem in that the sensor as a whole becomes large.

A rotary sensor according to the invention has been made taking such problems into consideration, and there is provided a compact rotary sensor that is easy to assemble by improving the shape and mounting of the spring member.

(1) In order to solve the above problems, a rotary sensor according to the invention has a housing, a rotary body rotatably supported in the housing, a detection unit operated by rotating the rotary body, and a driving shaft inserted in a recess formed on the rotary body for rotating the rotary body, and it has a configuration in which a spring member made of metal having at least a pair of arm sections and a connecting section connecting the arm sections is disposed in the recess of the rotary body and in which the driving shaft is sandwiched and held by the pair of arm sections with an elastic pressure applied thereto.

(2) The recess of the rotary body of the rotary sensor according to the invention has wall sections facing each other, and the pair of arm sections are in elastic contact with the wall sections.

(3) At least either of the arm sections of the rotary sensor according to the invention has an elastic piece that is bent to extend toward the connecting section, and the driving shaft is in elastic contact with the elastic piece.

(4) An inclined portion extending toward the arm section is provided on the elastic piece of the rotary sensor according to the invention.

(5) A protrusion is provided in the recess of the rotary sensor according to the invention, and at least either of the arm sections is provided with a slit extending in the axial direction of the driving shaft across the connecting section and the arm section, the slit being engaged with the protrusion.

(6) The spring member of the rotary sensor according to the invention forms a substantially U-like configuration in combination with the pair of arm sections and the connecting section, and the pair of arm sections are in a symmetrical configuration.

(7) The arm sections have base portions in a face-to-face relationship with the wall section of the rotary body, and reinforcement units for preventing the deformation of the base portions are provided at the base portions.

(8) The base portions have ribs formed to extend in the axial direction of the driving shaft, and the reinforcement units are constituted by the ribs.

(9) The ribs are formed such that they bulge out toward the wall sections.

(10) The base portions have bent pieces formed such that they extend in the axial direction of the driving shaft, and the reinforcement units are constituted by the bent pieces.

(11) The bent pieces are bent toward the wall sections.

(12) The base portions have hardened parts which have been hardened through a punching process, and the reinforcement units are constituted by then hardened parts which are formed such that they extend in the axial direction of the driving shaft.

(13) The pair of arm sections are in elastic contact with sides of the recess of the rotary body, and the connecting section is held at the rotary body by the spring member such that the connecting section is in contact with the bottom of the recess of the rotary body.

DETAILED DESCRIPTION OF THE PREFERRED EMBODIMENT

Figure 1:
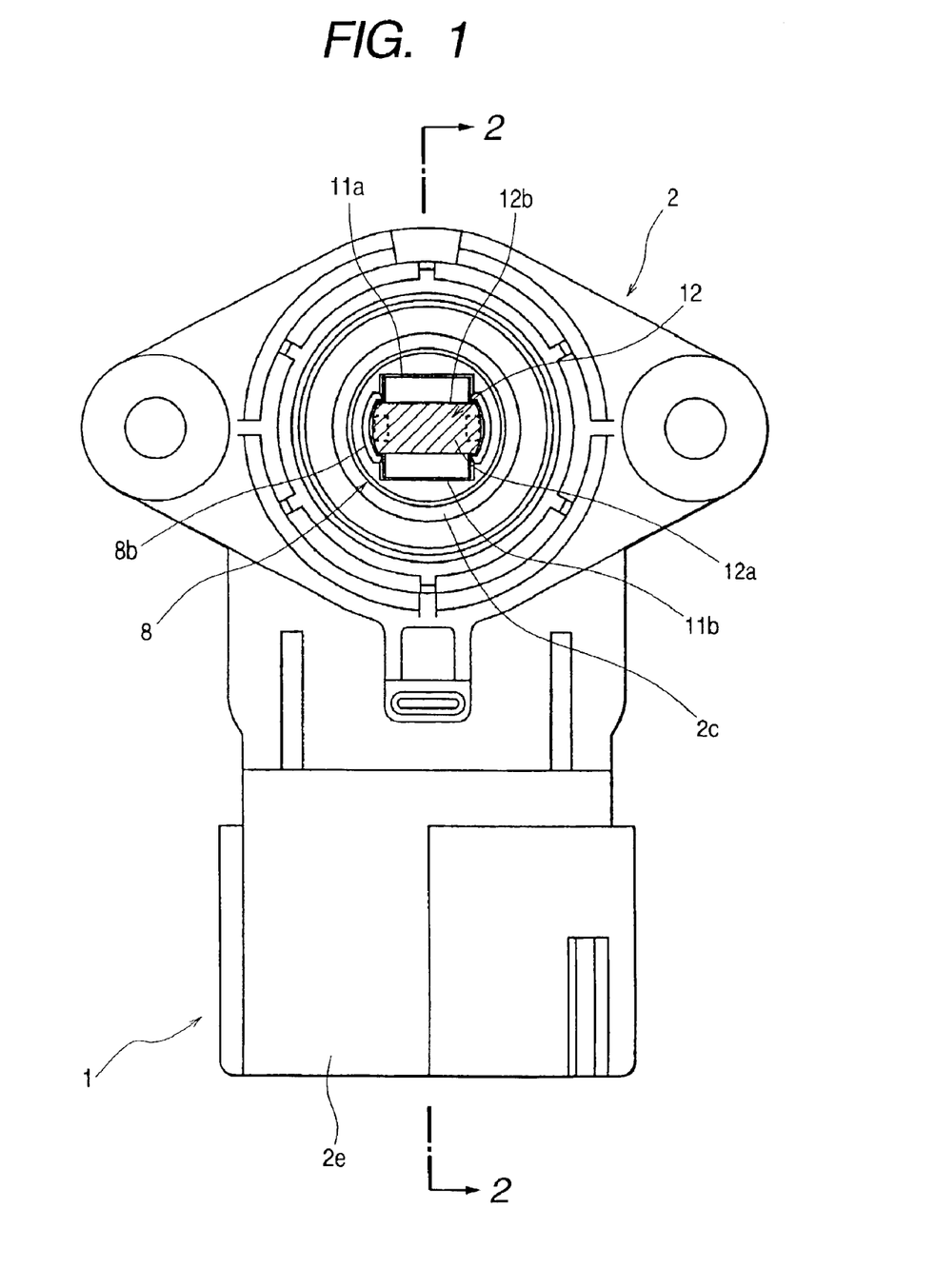
FIG. 1 is a front view of a first embodiment of a rotary sensor according to the invention.
Figure 2:
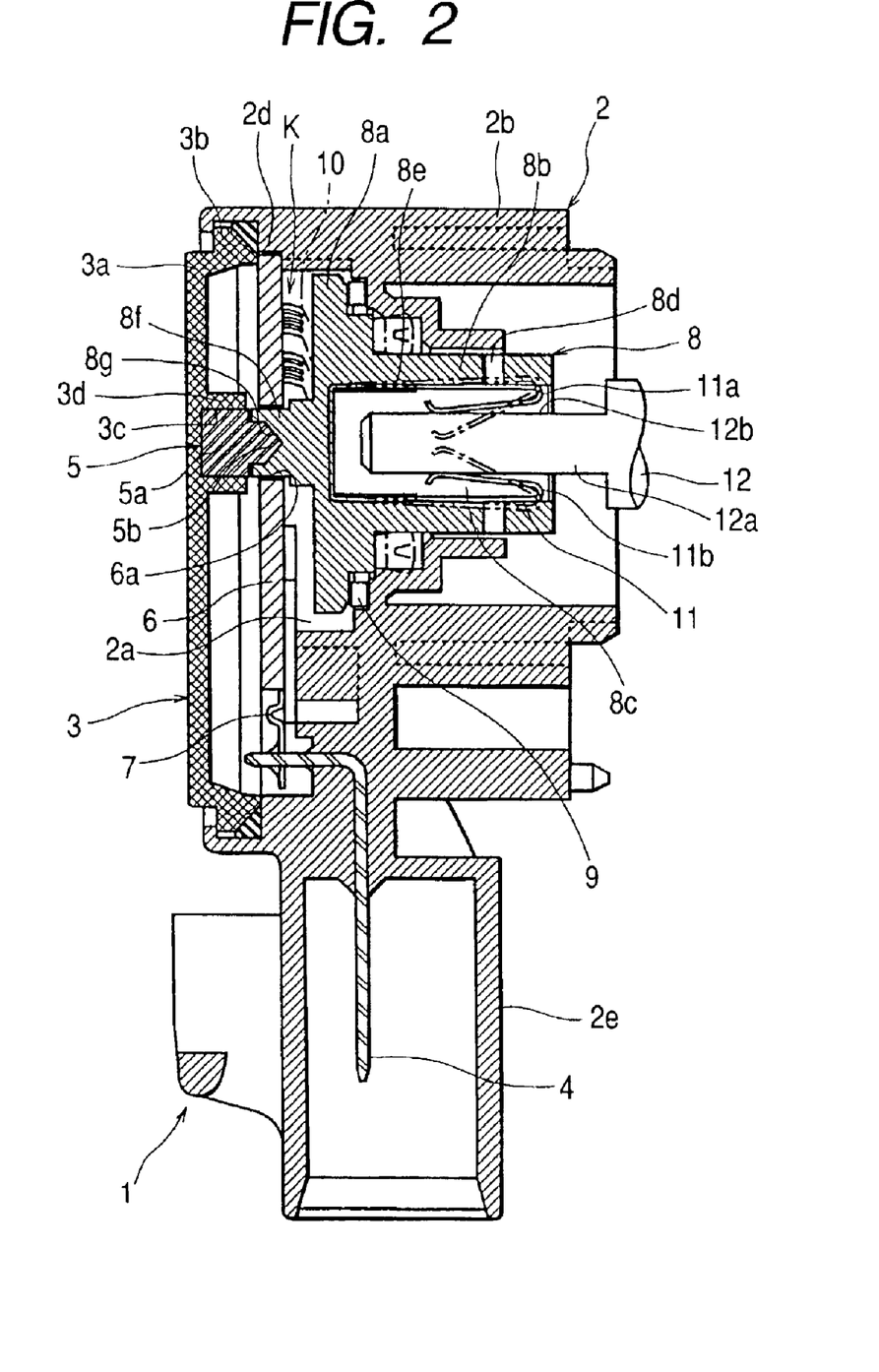
FIG. 2 is a sectional view taken along the line 2—2 in FIG. 1.
Figure 3:
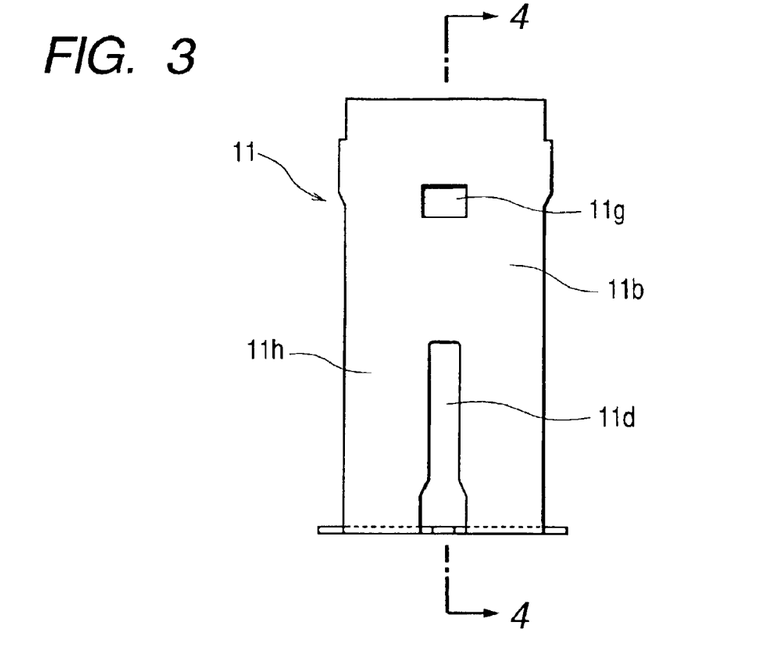
FIG. 3 is a front view of a spring member of the first embodiment of a rotary sensor according to the invention.
Figure 4:
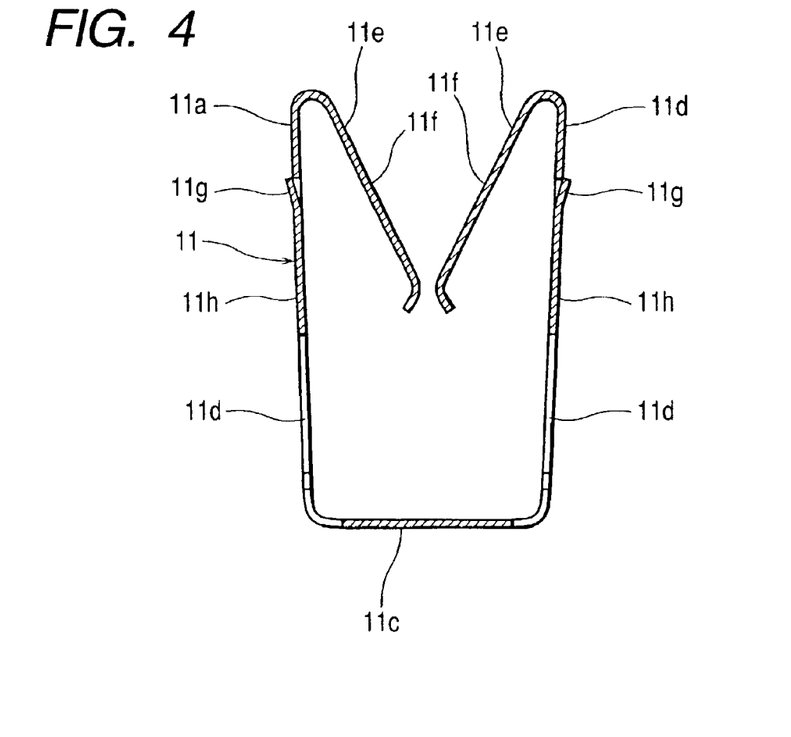
FIG. 4 is a sectional view taken along the line 4—4 in FIG. 3.
Figure 5:
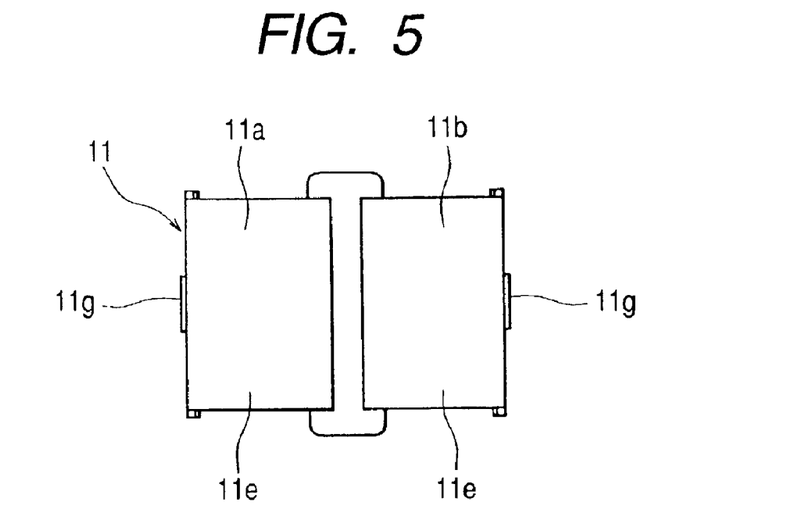
FIG. 5 is a plan view of the spring member of the first embodiment of a rotary sensor according to the invention.
Figure 6:
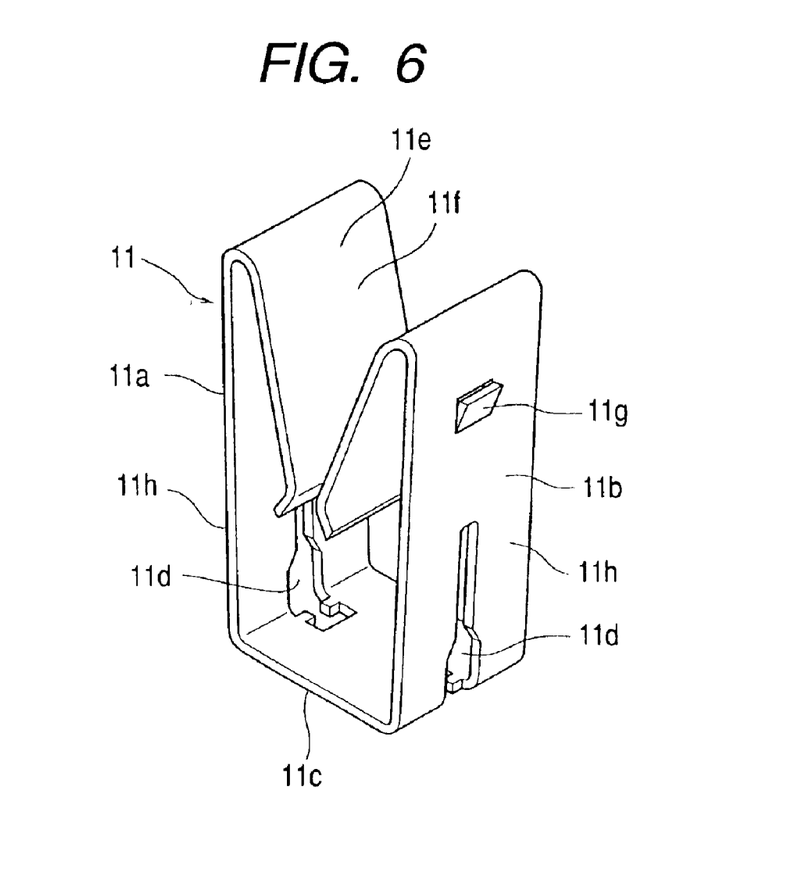
FIG. 6 is a perspective view of the spring member of the first embodiment of a rotary sensor according to the invention.

Referring to drawings of a rotary sensor according to the invention, FIG. 1 is a front view of a first embodiment of a rotary sensor according to the invention; FIG. 2 is a sectional view taken along the line 2—2 in FIG. 1; FIG. 3 is a front view of a spring member of the first embodiment of a rotary sensor according to the invention; FIG. 4 is a sectional view taken along the line 4—4 in FIG. 3; FIG. 5 is a plan view of the spring member of the first embodiment of a rotary sensor according to the invention; and FIG. 6 is a perspective view of the spring member of the first embodiment of a rotary sensor according to the invention.

Figure 7:
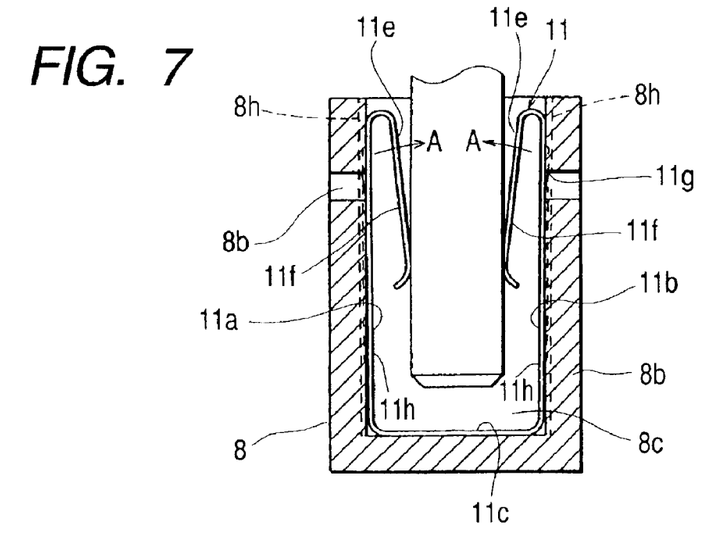
FIG. 7 is a sectional view of a major part relating to a second embodiment of a rotary sensor according to the invention and showing a relationship between a rotary body, a spring member, and a driving shaft.
Figure 8:
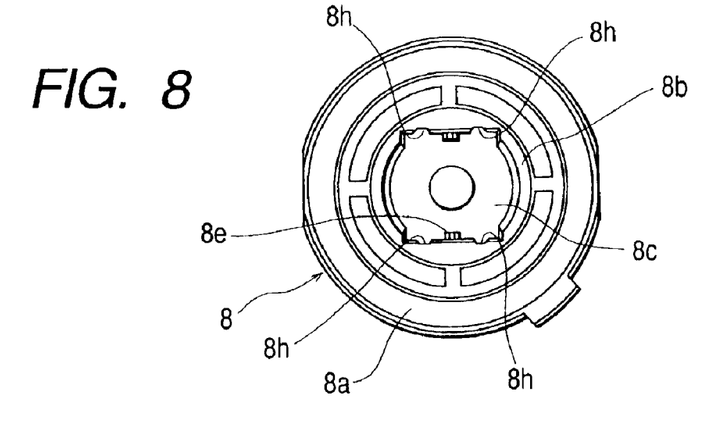
FIG. 8 is a front view of the rotary body of the second embodiment of a rotary sensor according to the invention.
Figure 9:
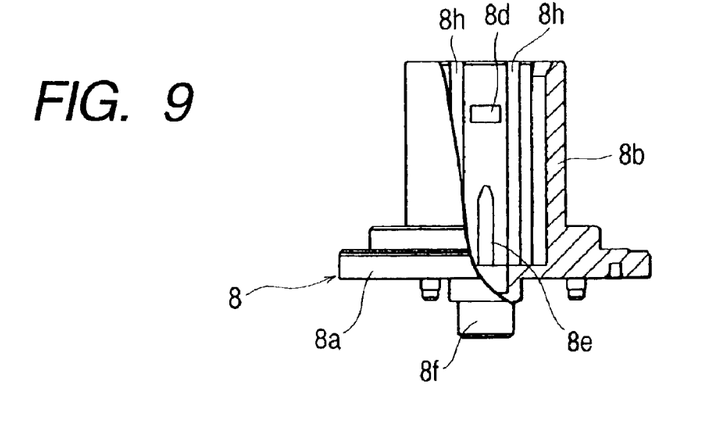
FIG. 9 is a partially cutaway side view of a major part of the rotary body of the second embodiment of a rotary sensor according to the invention.

FIG. 7 relates to a second embodiment of a rotary sensor according to the invention, and it is a sectional view of a major part showing a relationship between a rotary body, a spring member, and a driving shaft. FIG. 8 is a front view of a rotary body of a second embodiment of a rotary sensor according to the invention. FIG. 9 is a partially cutaway side view of the rotary body of the second embodiment of a rotary sensor according to the invention showing a major part of the same.

Figure 10:
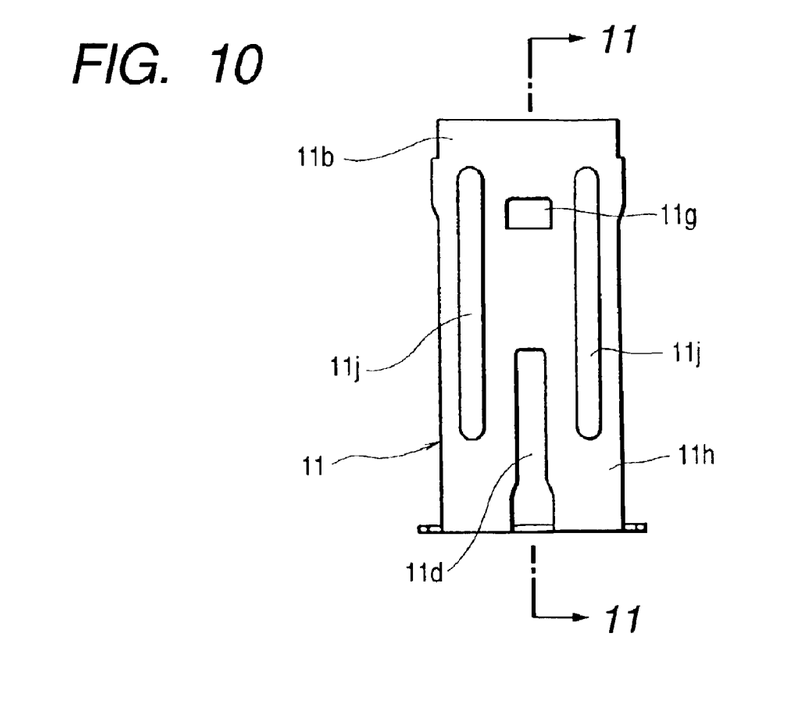
FIG. 10 is a front view of the spring member of the second embodiment of a rotary sensor according to the invention.
Figure 11:
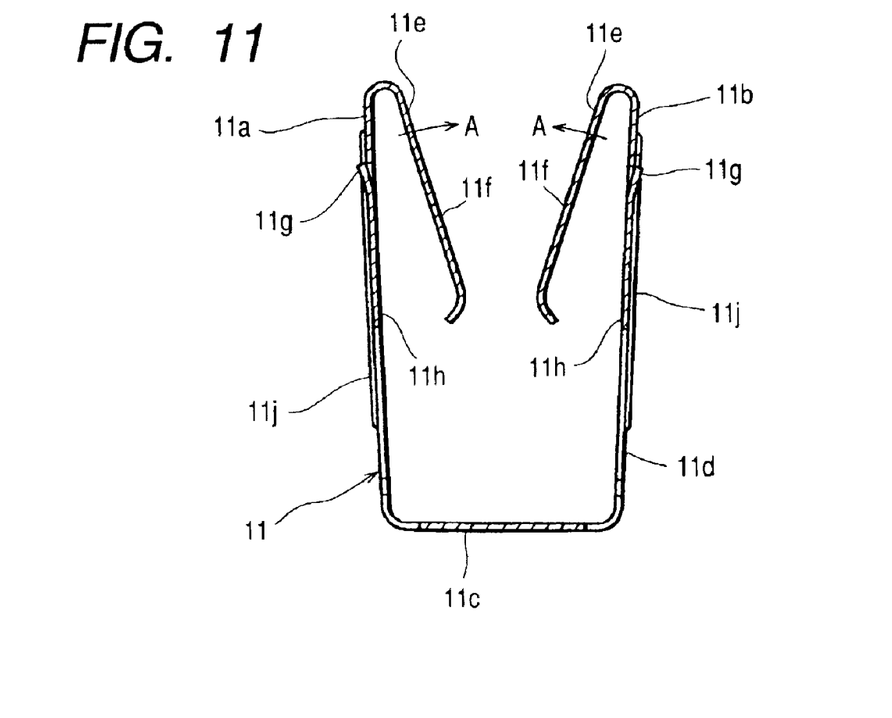
FIG. 11 is a sectional view taken along the line 11—11 in FIG. 10.
Figure 12:
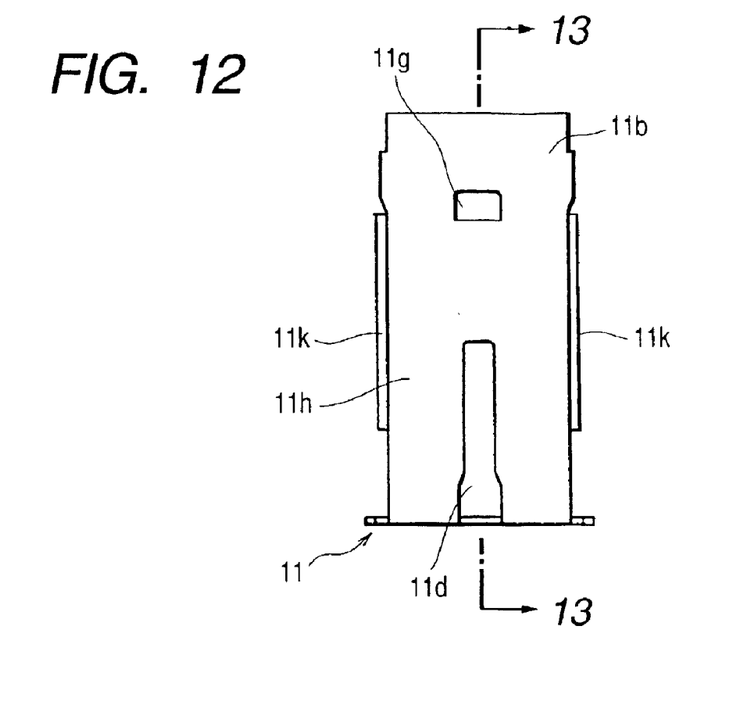
FIG. 12 is a front view of a spring member of a third embodiment of a rotary sensor according to the invention.
Figure 13:
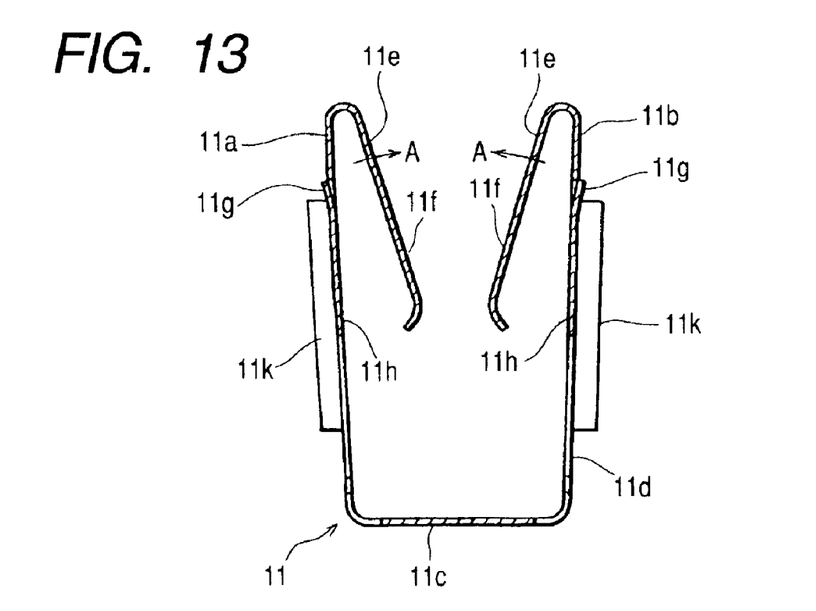
FIG. 13 is a sectional view taken along the line 13—13 in FIG. 12.

FIG. 10 is a front view of the spring member of the second embodiment of a rotary sensor according to the invention. FIG. 11 is a sectional view taken along the line 11—11 in FIG. 10. FIG. 12 is a front view of a spring member of a third embodiment of a rotary sensor according to the invention. FIG. 13 is a sectional view taken along the line 13—13 in FIG. 12.

Referring now to a configuration of the first embodiment of a rotary sensor according to the invention based on FIGS. 1 to 6, the housing 1 is constituted by a case 2 that is a part molded from synthetic resin and a lid 3 that closes an opening of the case 2 located at a rear side of the same.

The case 2 has a cylindrical side wall 2b having a container section 2a therein, a receiving section 2c having two steps that is a cylindrical section protruding into the container section 2a from the side wall 2b, a shoulder section 2d having two steps provided at the opening at the rear side of the side wall 2b, and a cylindrical section 2e formed such that it extends perpendicularly from the side wall 2b.

The lid 3 has a dish-like configuration and has a plate-like section 3a, a flange section 3b provided at the periphery of the plate-like section 3a, and a holding section 3d forwardly protruding from the disk-like section 3a and having a recess 3c in the middle thereof.

The lid 3 is placed on the shoulder section 2d at the opening on the rear side of the case 2 and attached to the case 2 to close the opening by thermally caulking the rear part of the side wall 2b of the case 2.

A plurality of terminals 4 made of metal is used for a connector. The terminals 4 are embedded and mounted in the case 2 such that one end of each terminal protrudes into the container section 2a of the case 2 and such that the other end protrudes into the cylindrical section 2e.

A support section 5 made of metal has a columnar section 5a and a conical section 5b provided in front of the columnar section 5a, and the support section 5 is held at the holding section 3d by inserting the columnar section 5a into the recess 3c.

A plate-like insulated substrate 5 has a hole 6a in the middle thereof, and a resistor pattern and a collector pattern made of a highly conductive material are provided on one surface of the insulated substrate 55 although not shown. The resistor pattern and the collector pattern are in conduction to a plurality of terminal sections 7 attached to the insulated substrate 6.

The insulated substrate 6 is contained in the container section 2a such that a peripheral part of the same is placed on the shoulder section 2d and such that the hole 6a faces the support section 5. The insulated substrate 7 is attached to the case 2 by urging a peripheral part thereof against the shoulder section 2d with the lid 3 attached to the case 2, and the terminal sections 7 are solder-connected to terminals 4 for a connector protruding into the container section 2a.

A rotary body 8 that is a part molded from synthetic resin has a disk-shaped section 8a, a cylindrical wall section 8b forwardly protruding from the center of the disk-shaped section 8a, a recess 8c provided in the middle of the cylindrical wall section 8b, engaging sections 8d constituted by recesses provided in the vicinity of both ends of the side wall 8b, a pair of protrusions 8e formed opposite to each other across a bottom surface and an inner wall of the recess 8c, a protrusion 8f protruding from the center of the disk-shaped section 8a rearward, and a conical hole 8g provided at the rear end of the protrusion 8f.

The rotary body 8 is contained in the container section 2a of the case 2. The cylindrical wall section 8b is inserted in the receiving section 2c; the protrusion 8f is inserted in the hole 6a of the insulated substrate 6; and the conical section 5b is fitted in the recess 8g. Thus, the rotary section 8 is rotatably held and pivotally supported by the protrusion 8f such that it can be inclined.

The rotary body 8 is normally urged against the supporting section 5 by a wave washer 9 provided in a deflected state between the disk-shaped section 8a and the receiving section 2c.

A slider 10 is constituted by a conductive spring plate. The slider 10 is attached to a bottom surface of the disk-shaped section 8a and is capable of sliding on the resistor pattern and the collector pattern.

The resistor pattern, the collector pattern, and the slider 10 form a detection unit K that is a rotary variable resistor for detecting a rotation angle.

The detection unit K may be constituted by a rotary encoder instead of the rotary variable resistor.

As shown in FIGS. 3 to 6, a spring member 11 made of a springy material is formed in a U-like configuration and is equipped with a pair of arm sections, i.e., a first arm section 11a and a second arm section 11b facing each other, a connecting section 11c connecting the first and second arm sections 11a and 11b, and slits 11d provided across the connecting section and the first and second arm sections 11a and 11b, respectively.

The first and second arm sections 11a and 11b have an elongate base portion 11h and an elastic piece 11e formed by bending the base portion 11h at a bent portion at the end of the base portion toward the connecting section 11c. The elastic piece 11e is provided with an inclined portion 11f extending toward the other arm section 11a (or 11b), and the interval between the pair of elastic pieces 11e decreases toward the connecting section 11c. Anchoring portions 11g constituted by cut and raised pieces are provided at the base portions 11h of the first and second arm sections 11a and 11b between the bent portions and the slits 11d. The pair of arm sections, i.e., the first and second arm sections 11a and 11b is symmetrically formed.

Such a spring member 11 is inserted in the recess 8c of the rotary body 8 from the side of the same where the connecting section 11c is located, and the base portions 11h of the first and second arm sections 11a and 11b are contained in the recess 8c in contact with inner walls of the recess in a face-to-face relationship.

During such insertion, since the protrusion 8e formed in the recess 8c engages the slit 11d, the inserting position of the spring member 11 can be easily located and the insertion can be reliably carried out. Further, any shift of the spring member 11 in the radial direction thereof can be reliably prevented after the spring member 11 is inserted. When the anchoring portions 11g meet the engaging portions 8d of the wall section 8b, the anchoring portions 11g are engaged with the engaging portions 8d to prevent the spring member 11 from coming out the recess 8c. Since the spring member 11 is inserted in the recess 8c having greater dimensions, the incorporation is quite simple. Further, since the first and second arm sections 11a and 11b are symmetrical, there is no directional requirement for insertion, which allows the spring member 11 to be more easily incorporated.

A driving shaft 12 is constituted by a rod-shaped metal material. It has an inserting section 12a at the rear end thereof, and the inserting section 12a has a substantially rectangular section and has a pair of flat surfaces 12b. Such a driving shaft 12 is press-fitted between the first and second arm sections 11a and 11b of the spring member 11 and contained in the recess 8c of the rotary body 8. The driving shaft 12 is provided on a vehicle body such that it rotates in cooperation with a throttle valve of the vehicle.

Specifically, the driving shaft 12 is press-fitted such that the flat surfaces 12b face the first and second arm sections 11a and 11b to expand the elastic pieces 11e by force during the process of press-fitting the driving shaft 12, as shown in FIG. 2. Since the first and second arm sections 11a and 11b are provided with the inclined portions 11f the interval between which gradually decreases, the driving shaft 12 can be easily press-fitted. Further, since the driving shaft 12 is automatically positioned under the guidance of the inclined portions 11f, the driving shaft 12 can be accurately positioned without defining a strict position for the driving shaft 12, which improves ease of assembly.

When the elastic pieces 11e are expanded by force, the base portions 11h of the first and second arm sections 11a and 11b are elastically urged against the wall sections 8b to be slightly deflected toward the driving shaft 12. Thus, parts of the base portions 11h in the lateral direction of the same are in line contact with the wall section 8b in two positions in the vicinity of both ends of the base portions in the longitudinal direction thereof. At this time, since the elastic pieces 11e are provided, the length of the base portions 11h in the axial direction thereof can be maintained, which allows the spring member 11 to be more tightly held in the recess 8c to hold the spring member 11 with stability. Since the spring member 11 is thus urged against the wall section 8b at the base portions 11h thereof and urged against the flat surfaces 12b with the elastic pieces lie thereof, the spring member 11 itself is held with stability and rigidly sandwiched by urging the elastic pieces 11e against the flat surfaces 12b.

A very high spring constant is set for the elastic pieces 11e to fit the driving shaft 12 and the spring member 11 rigidly.

Furthermore, the flat surfaces 12b and the elastic pieces lie are in line contact, which allows the driving shaft 12 to be held more rigidly. The spring member 11 is positioned on the rotary body 8 as described above, and the wall section 8b is less likely to deflect and hard because it is a part molded from synthetic resin, which eliminates the possibility of a movement of the spring member 11 relative to the rotary body 8. Since the driving shaft 12 is rigidly fitted to the spring member 11, there is no possibility of a movement of the driving shaft 12 relative to the spring member 11, which eliminates the possibility that the driving shaft 12 comes off the rotary body 8.

Since the driving shaft 12 is spline-coupled with the recess 8c through the spring member 11 as shown in FIG. 1, the risk of slippage of rotation is significantly small.

When the driving shaft 12 is rotated, the rotary body 8 is rotated to cause the slider 10 to slide on the resistor pattern and the collector pattern formed on the insulated substrate 6 which are not shown, and the detection unit K is thus operated to output a variable output voltage. When a load in the radial direction is applied to the driving shaft 12, the driving shaft 12 is inclined along with the rotary body 8. This causes the wave washer 9 to contract to absorb the load, and a restoring force of the wave washer 9 returns the rotary body 8 to the initial position. Even if the driving shaft 12 is incorporated off center, the rotary body 8 is inclined about the conical section 5b to prevent an excessive force from being applied to the receiving section 2c, which makes the driving shaft 12 less vulnerable to abrasion. Since the rotary body 8 can be rotated with stability because it is rotated about the conical section 5b, the possibility of any change in the positions of the slider 10 and the resistor can be reduced.

The rotary sensor according to the invention has the above-described configuration and, referring now to the operation of the same, the driving shaft 12 is linked with a throttle valve of an automobile and is rotated as the throttle valve rotates. When the driving shaft 12 rotates, the rotary body 8 rotates to change the output voltage, and the change can be detected by a microcomputer to detect the rotation angle.

While the rotary sensor according to the invention has the above-described configuration, it is obvious that the invention is not limited to the above embodiment and it is not essential that the first and second arm sections 11a and 11b of the spring member 11 are in elastic contact with the wall section 8b of the rotary body 8 as long as the driving shaft 12 can be held. Specifically, the spring member 11 may have any configuration as long as it can be inserted in the recess 8c. While the first and second arm sections 11a and 11b of the present embodiment have the elastic pieces 11e the driving shaft 12 may be sandwiched by forming the base portions 11h in a V-shaped configuration with the elastic pieces lie deleted.

While the inclined portions 11f of the elastic pieces 11e have been described as extending toward each other's arm section 11a (11b), they may be in parallel with the base portions 11h and may be inclined such that they extend toward the base portions 11h of themselves. It is not essential to provide the elastic pieces 11e on the pair of arm sections, i.e., the first and second arm sections 11a and 11b, and they may be provided on either of the arm sections.

Although the spring member has been described as being constituted by only a pair of arm sections 11a and 11b in the above embodiment, three or more arms, e.g., two or three pairs of arms may be provided as long as they are configured to sandwich the driving shaft 12.

FIGS. 7 to 11 show a second embodiment of a rotary sensor according to the invention. Referring now to a configuration of the second embodiment, a wall section of a recess 8c of a rotary body 8 is provided with a clearance section 8h that is formed such that it extends in the axial direction of a driving shaft 12. Since the configuration of the rotary body 8 is otherwise the same as that of the first embodiment, the following description will omit the configuration with like parts indicated by like reference numerals.

A pair of ribs 11j extending in the axial direction of the driving shaft 12 is provided at respective base portions 11h of first and second arm sections 11a and 11b of a spring member 11, and the ribs 11j serve as reinforcement units for preventing deformation of the base portions 11h.

Since the configuration of the spring member 11 is otherwise the same as that of the first embodiment, the following description will omit the configuration with like parts indicated by like reference numerals.

Further, since the configurations of parts other than the rotary body 8 and the spring member 11 are the same as those in the first embodiment, the following description will omit them with like pars indicated by like reference numerals.

The spring member 11 having such a configuration is contained in a container section 8c of the rotary body 8 with the base portions 11h in contact with the wall section of the recess 8c in a face-to-face relationship, as shown in FIG. 7.

When the spring member 11 is mounted, the ribs 11j that are reinforcement units are located in the clearance section 8h.

The driving shaft 12 is then inserted between the first and second arm sections 11a and 11b in such a state. At this time, elastic pieces 11e are pressed and deflected by the driving shaft 12, and the ribs 11j that are reinforcement units prevent the deformation of the pair of base portions 11h which are otherwise deformed in the direction of the arrow A consequently.

As a result, substantially no deformation occurs on the first and second arm sections 11a an 11b, and only the elastic pieces lie are deformed, which makes it possible to prevent any variation of amounts of leftward and rightward deflection. The position of the driving shaft 12 relative to the recess 8c in the planar direction (the direction of the plane of FIG. 8) is thus less likely to change even when the driving shaft 12 rotates, and any deviation from the center is eliminated to provide excellent detection accuracy.

Since the ribs 11j are formed such that they bulge out on the wall section of the recess 8c, the deflection of the elastic pieces lie will not be hindered by the ribs 11j.

The ribs 11j may bulge out in the direction opposite to the wall section of the recess 8c.

FIGS. 12 and 13 show a third embodiment of a rotary sensor according to the invention and, referring now to a configuration of the third embodiment, a pair of bent pieces 11k extending in the axial direction of a driving shaft 12 are provided on both sides of base portions 11h of first and second arm sections 11a and 11b of a spring member 11, and the bent pieces 11k serve as reinforcement units for preventing deformation of the base portions 11h.

Since the configuration is otherwise the same as that of the second embodiment, the following description will omit the same with like parts indicated by like reference numerals.

The spring member 11 having such a configuration is contained in a recess 8c of a rotary body 8 with the base portions 11h in contact with a wall section of the recess 8c in a face-to-face relationship.

When the spring member 11 is mounted, the bent pieces 11k that are reinforcement units are located in a clearance section 8h.

The driving shaft 12 is then inserted between the first and second arm sections 11a and 11b in such a state. At this time, elastic pieces 11e are pressed and deflected by the driving shaft 12, and the bent pieces 11k that are reinforcement units prevent deformation of the pair of base portions 11h which are otherwise deformed in the direction of the arrow A.

As a result, substantially no deformation occurs on the first and second arm sections 11a and 11b, and only the elastic pieces 11e are deformed, which makes it possible to prevent any variation of amounts of leftward and rightward deflection. The position of the driving shaft 12 relative to the recess 8c in the planar direction (the direction of the plane of FIG. 8) is thus less likely to change even when the driving shaft 12 rotates, and any deviation from the center is eliminated to provide excellent detection accuracy.

Since the bent pieces 11k are bent toward the wall section of the recess 8c, the deflection of the elastic pieces 11e will not be hindered by the bent pieces 11k.

The bent pieces 11k may be bent in the direction opposite to the wall section of the recess 8c.

In this case, the bent pieces 11k prevent the elastic pieces 11e of another spring member 11 from entering the gap formed by the elastic pieces 11e and the base portions 11h to prevent the spring members 11 from clinching.

As still another embodiment, although not shown, hardened sections that are hardened through a punching process may be formed at the base portions 11h, and the hardened sections may be formed such that they extend in the axial direction of the driving shaft to use them as reinforcement units.

The hardened sections as reinforcement units also make it possible to prevent the deformation of the base portions 11h. Consequently, the amount of deformation of the first and second arm sections 11a and 11b can be suppressed; the relative positions of the driving shaft 12 and the rotary body 8 in the planar direction can be made less likely to change even when the driving shaft 12 is rotated; and deviation from the center can be eliminated to provide excellent detection accuracy.

A spring member made of metal of having at least a pair of arm sections and a connecting section for connecting the arm sections is disposed in a recess in which a driving shaft of a rotary body of a rotary sensor according to the invention is inserted, and the driving shaft is sandwiched with an elastic pressure by the pair of arm sections. It is only required to dispose the spring member in the recess in which the driving shaft is inserted, and the recess has a relatively large diameter to allow the insertion of the driving shaft. This improves ease of incorporation and therefore makes it possible to provide a rotary sensor with high mass-productivity. Since there is no need for providing a part for containing the spring member in addition to the recess in which the driving shaft is inserted, the rotary body can be made compact to allow a reduction of the size of the device as a whole.

The recess of the rotary body of the rotary sensor according to the invention has wall sections facing each other, and the pair of arm sections is in elastic contact with the wall sections. Since this allows the spring member to be held at the rotary body with stability, there is no possibility that the spring member will come off the rotary body, which consequently stabilizes the position of the driving shaft, allows the rotary body to rotate with stability, and allows a stable output to be provided.

At least either of the arm sections of the rotary sensor according to the invention has an elastic piece that is bent toward the connecting section, and the driving shaft is in elastic contact with the elastic piece. Since this makes it possible to increase the length of the part of the arm section in elastic contact with the rotary body, the spring member can be reliably held, and a rotary sensor having good output characteristics can be consequently provided.

Since the elastic pieces of the rotary sensor according to the invention are provided with inclined portions extending toward the opposite arm sections, the driving shaft can be easily inserted from the front. Further, since the driving shaft is automatically positioned under the guidance of the inclined portions, the driving shaft can be accurately positioned without strictly determining the position of the driving shaft, which makes it possible to provide a rotary sensor with a higher ease of assembly and high mass-productivity.

A protrusion is provided in the recess of the rotary sensor according to the invention, and slits are provided at the arm sections such that they extend in the axial direction of the driving shaft across the connecting portion and the arm sections and are engaged with the protrusion. Thus, positioning can be easily carried out during the insertion of the spring member because it is only required to engage the protrusion with the recess, which improve ease of assembly and provides high mass-productivity. Further, the rotation of the spring member can be also stopped by the engagement between the recess and the protrusion, a highly reliable rotary sensor can be provided.

The spring member of the rotary sensor according to the invention has a configuration in which the pair of arm sections and the connecting portion form a substantially U-like configuration and in which the pair of arm sections are symmetric. Since there is no directional requirement for the incorporation of the spring member, the spring member can be easily incorporated, which makes it possible to provide a rotary sensor with higher ease of assembly and mass-productivity.

The arm sections of the rotary sensor according to the invention have base portions facing the wall sections of the rotary body, and reinforcement units for suppressing the deformation of the base portions are provided at the base portions. This suppresses the deformation of the base portions in the direction of the arrow A when the driving shaft is inserted between the first and second arm sections and consequently makes the amount of deformation of the first and second arm sections uniform. This makes it easy to uniquely determine the position of the driving shaft relative to the rotary body, thereby improving detection accuracy.

Ribs formed to extend in the axial direction of the driving shaft are provided at the base portions of the rotary sensor according to the invention, and the ribs constitute the reinforcement unit. This allows a simple configuration at a low cost.

Since the ribs of the rotary sensor according to the invention are formed such that they bulge out on the wall sections, compactness can be achieved while preventing the deflection of the elastic pieces from being hindered by the ribs.

Bent pieces formed to extend in the axial direction of the driving shaft are provided at the base portions of the rotary sensor according to the invention, and the bent pieces constitute the reinforcement units. This allows a simple configuration at a low cost.

Since the bent pieces of the rotary sensor according to the invention are bent toward the wall sections, compactness can be achieved while preventing the deflection of the elastic pieces from being hindered by the bent pieces.

Hardened sections that are hardened through a punching process are provided at the base portions of the rotary sensor according to the invention, and the reinforcement units are constituted by the hardened sections that are formed to extend in the axial direction of the driving shaft. This suppresses the deformation of the base potions in the direction of the arrow A when the driving shaft is inserted between the first and second arm sections and consequently makes the amount of deformation of the first and second arm sections uniform. Thus, any deviation of the center of the driving shaft can be eliminated to improve operability, and compactness can be achieved through the elimination of the ribs and bent pieces.

Since the spring member of the rotary sensor according to the invention is held at the rotary body such that the pair of arm sections are in elastic contact with side surfaces of the recess of the rotary body and such that the connecting section is in contact with the bottom of the recess of the rotary body, an operation of incorporating the spring member can be simplified, and a space for holding the driving shaft can be maintained.

What is claimed is:

1. A rotary sensor comprising:

a housing;

a rotary body rotatably supported in the housing;

a detection unit operated by rotating the rotary body; and a driving shaft inserted in a recess formed on the rotary body for rotating the rotary body, wherein a spring member made of metal having at least a pair of arm sections and a connecting section for connecting the arm sections is disposed in the recess of the rotary body; and the driving shaft is elastically pressed and sandwiched by the pair of arm sections, wherein the recess of the rotary body has wall sections facing each other; and the pair of arm sections are in elastic contact with the wall sections, and wherein at least either of the arm sections has an elastic piece that is bent to extend toward the connecting section; and the driving shaft is in elastic contact with the elastic piece.

2. A rotary sensor according to claim 1, wherein an inclined portion extending toward the other arm section is provided at the elastic piece.

3. A rotary sensor comprising:

a housing;

a rotary body rotatably supported in the housing;

a detection unit operated by rotating the rotary body; and a driving shaft inserted in a recess formed on the rotary body for rotating the rotary body, wherein a spring member made of metal having at least a pair of arm sections and a connecting section for connecting the arm sections is disposed in the recess of the rotary body; and the driving shaft is elastically pressed and sandwiched by the pair of arm sections, and wherein a protrusion is provided in the recess; at least either of the arm sections is provided with a slit extending in the axial direction of the driving shaft across the connecting section and the arm section; and the slit is engaged with the protrusion.

4. A rotary sensor comprising:

a housing;

a rotary body rotatably supported in the housing;

a detection unit operated by rotating the rotary body; and a driving shaft inserted in a recess formed on the rotary body for rotating the rotary body, wherein a spring member made of metal having at least a pair of arm sections and a connecting section for connecting the arm section is disposed in the recess of the rotary body; and the driving shaft is elastically pressed and sandwiched by the pair of arm sections, and wherein the arm sections have a base portion facing a wall section of the rotary body; and a reinforcement unit for suppressing the deformation of the base portion is provided at the base portion.

5. A rotary sensor according to claim 4, wherein a rib that is formed to extend in the axial direction of the driving shaft is provided at the base portion; and the reinforcement unit is constituted by the rib.

6. A rotary sensor according to claim 5, wherein the rib is formed such that the rib bulges out on the wall section.

7. A rotary sensor according to claim 4, wherein a bent piece that is formed to extend in the axial direction of the driving shaft is provided at the base portion; and the reinforcement unit is constituted by the bent piece.

8. A rotary sensor according to claim 7, wherein the bent piece is bent toward the wall section.

9. A rotary sensor according to claim 4, wherein a hardened section that is hardened through a punching process is provided at the base portion; and the reinforcement unit is constituted by the hardened section that is formed to extend in the axial direction of the driving shaft.

* * * * *